(12) United States Patent
Palumbo et al.

(10) Patent No.: US 12,306,107 B2
(45) Date of Patent: May 20, 2025

(54) NEPHELMOTRIC MEASURING DEVICE(S)

(71) Applicant: Tintometer GmbH, Dortmund (DE)

(72) Inventors: Perry Palumbo, Fort Collins, CO (US); Elmar Grabert, Dortmund (DE)

(73) Assignee: Tintometer GmbH, Dortmund (DE)

( * ) Notice: Subject to any disclaimer, the term of this patent is extended or adjusted under 35 U.S.C. 154(b) by 0 days.

(21) Appl. No.: 18/530,979

(22) Filed: Dec. 6, 2023

(65) Prior Publication Data

US 2024/0102935 A1 Mar. 28, 2024

Related U.S. Application Data

(62) Division of application No. 17/433,100, filed as application No. PCT/US2020/058578 on Nov. 2, 2020, now Pat. No. 11,885,748.

(51) Int. Cl.

| G01N 21/51 | (2006.01) |
| G01N 15/02 | (2024.01) |
| G01N 15/0205 | (2024.01) |
| G01N 15/06 | (2006.01) |
| G01N 21/53 | (2006.01) |

(Continued)

(52) U.S. Cl.
CPC .............. *G01N 21/82* (2013.01); *G01N 15/02* (2013.01); *G01N 15/06* (2013.01); *G01N 21/51* (2013.01); *G01N 21/532* (2013.01); *G01N 21/645* (2013.01)

(58) Field of Classification Search
None
See application file for complete search history.

(56) References Cited

U.S. PATENT DOCUMENTS 3,065,665 A 11/1962 Akhtar et al.
3,869,209 A 3/1975 Sigrist
(Continued)

FOREIGN PATENT DOCUMENTS

EP 0992786 B1 10/2003
JP S50159776 A 12/1975
(Continued)

*Primary Examiner* — Neil N Turk
(74) *Attorney, Agent, or Firm* — McNees Wallace & Nurick LLC

(57) ABSTRACT

Nephelometric measuring devices are described. The nephelometric measuring devices can be configured such that an amount of scattered light having different pathlengths impingent upon one or more scattered-light detectors from a beam propagating through a suspension can result in substantially equivalent sensitivity and in correlation between the scattered-light detectors' response and a turbidity value of the suspension. The response of the scattered-light detector(s) receiving scattered light at a nephelometric angle of 85-110° from a beam of light propagating through the suspension can be in accordance to an equation selected from a group of non-linear equations where:

$x/y = a_0 x^n + \ldots + a_2 x^2 + a_i x + a_o$; where "n" is an integer greater than 0; "x" is equal to the turbidity value of the suspension; "y" is equal to the response of the scattered-light detector; and "an" are calibration coefficients. The maximum response of the scattered-light detector occurs at a turbidity value dependent upon the effective scattered-light pathlength.

7 Claims, 8 Drawing Sheets

(51) Int. Cl.
*G01N 21/64* (2006.01)
*G01N 21/82* (2006.01)

(56) References Cited

U.S. PATENT DOCUMENTS

| | | | | |
|---|---|---|---|---|
| 4,136,953 | A | * | 1/1979 | Klein .................... G01N 21/51 |
| | | | | 356/246 |
| 4,541,719 | A | * | 9/1985 | Wyatt .................... G01N 21/47 |
| | | | | 356/343 |
| 5,094,531 | A | | 3/1992 | Garner et al. |
| 5,506,679 | A | | 4/1996 | Cooper et al. |
| 6,177,994 | B1 | | 1/2001 | Watson et al. |
| 7,491,366 | B2 | | 2/2009 | Tokhtuev et al. |
| 7,505,132 | B2 | | 3/2009 | Palumbo |
| 2002/0113964 | A1 | * | 8/2002 | Togawa ............. G01N 15/0205 |
| | | | | 356/336 |
| 2003/0214653 | A1 | * | 11/2003 | Palumbo ................ G01N 21/51 |
| | | | | 356/338 |
| 2006/0044558 | A1 | | 3/2006 | Furukawa |
| 2006/0198761 | A1 | | 9/2006 | Tokhtuev et al. |
| 2007/0022985 | A1 | | 2/2007 | Sugie et al. |
| 2007/0077178 | A1 | | 4/2007 | Wagner |
| 2007/0222980 | A1 | | 9/2007 | Palumbo |
| 2010/0225920 | A1 | | 9/2010 | Xia et al. |
| 2010/0277733 | A1 | | 11/2010 | Holve |
| 2012/0281215 | A1 | | 11/2012 | Peters |
| 2014/0264077 | A1 | | 9/2014 | Tokhtuev et al. |
| 2015/0140577 | A1 | * | 5/2015 | Li .................... G01N 33/56972 |
| | | | | 250/226 |
| 2017/0248740 | A1 | | 8/2017 | Palumbo |
| 2017/0248795 | A1 | | 8/2017 | Palumbo |
| 2017/0307525 | A1 | | 10/2017 | Langhoff et al. |
| 2018/0136123 | A1 | | 5/2018 | Palumbo |
| 2019/0212033 | A1 | | 7/2019 | Consadori et al. |

FOREIGN PATENT DOCUMENTS

| | | |
|---|---|---|
| JP | H09292328 A | 11/1997 |
| JP | 2000097841 A | 4/2000 |
| JP | 2009531660 A | 9/2009 |

* cited by examiner

NEPHELMOTRIC MEASURING DEVICE(S)

CROSS REFERENCE TO RELATED APPLICATIONS

This application is a divisional application of U.S. Non-provisional patent application Ser. No. 17/433,100, filed Aug. 23, 2021, entitled "Nephelometric Measuring Device(s)" which claims the benefit of PCT Application No. PCT/US2020/058578 filed Nov. 2, 2020, both of which are incorporated herein by reference in their entirety.

BACKGROUND

In the determination of a concentration of particles, a turbidity, haze, or cloudiness of a suspension medium or the purity or absence of particles in a suspension medium, nephelometry or turbidimetric assay is often conducted wherein a beam of light is passed through the medium and the amount of light scattered is measured and equated to a reference standard. During a nephelometric assay, the amount of scattered light incident to detector at ~90° to a beam of light propagating through a suspension medium is substantially independent of the particle-size distribution (PSD). It is therefore a preferred method for the assay of a suspension medium of unknown particle-size distribution.

A device that can eliminate errors in the assay of instruments of prior art as result of non-nephelometric measurements included in the determination of the concentration of particles in a suspension medium is needed.

Given a sample within a 24 mm diameter glass vial containing a suspension of particles in a liquid medium, for example a formazine turbidity standard in water and observed at a nephelometric angle of 85-110° to the ray path of a beam of light propagating through the suspension medium, the response of a nephelometric detector to a change in the concentration of particles in the suspension medium is substantially linear at low turbidity values. A low turbidity value further defined as a value below 100 NTU, (Nephelometric Turbidity Units). At a higher turbidity values, turbidity values above 100 NTU, the amount of scattered light impingent upon the nephelometric detector is reduced disproportionately to an increase in the turbidity value. Dependent upon on the wavelength of the scattered light, at a turbidity value between 800-10,000 NTU, the response of the nephelometric detector to a change in the concentration of particles within the suspension medium reaches a maximum. Further increase in the concentration of particles in the suspension medium causes a reduction in the response of the nephelometric detector resulting in an ambiguity wherein, the detector response is equal at two turbidity values; a turbidity value greater than the maximum and a turbidity value less than the maximum nephelometric detector response. Devices of prior art avoid this ambiguity by including non-nephelometric measure of light at one or more additional angles relative to the ray path of the incident beam of light at angles of; back-scatter at between 5-85°, forward scatter at between 110-175° and at a transmittance at 180°. Devices of prior art fail to accurately measure high concentrations of particles in a suspension medium independent of particle sizes within the suspension medium. Inaccuracies in the detection of scattered light at non-nephelometric angles of unknown particle constituent is the result of a high intrinsic sensitivity of detectors at non-nephelometric angles to a change in the particle-size distribution within the sample in comparison to particle-size distribution within the calibration or reference standard.

Prior art device as example U.S. Pat. No. 7,491,366, Tokhtuev et al., uses both 90° and 180° optical geometries to measure the turbidity of a sample. The optical arrangement of Tokhtuev further measures turbidity along four ray paths comprised of two light emitters and four detectors. The prior art of Tokhtuev relies upon an amalgam of scattered light measurements at both 90° and 180° wherein the 180° measurements introduce a response to the particle sizes in the sample. The result is error in the assay of a sample of unknown particle-size distribution in comparison to the calibration standard of other or single particle-size distribution. Furthermore, the linearization equation of Tokhtuev requires five calibration standards due to the dependence on both nephelometric and transmittance terms, resulting in a more complex, prolonged, and expensive calibration. Also limiting in the prior art device of Tokhtuev are the introduction of measurement errors due to the acute angle of the incidence beam of light upon the cylindrical surfaces of the vial. The acute incident angle of the incident beam creates conditions wherein reflections and other polarization effects at the surfaces of the vial wall result in significant change in the amount of scattered light received at a detector for small changes in the position of the sample vial. Of other teachings of Tokhtuev, a disclosure of an increase in sensitivity for an optical arrangement wherein a second parallel incident ray paths possessing a shifted area of analysis close to the wall of a vial results in an increase in the sensitivity of a turbidity assay is taught.

A device that can demonstrate substantially equivalent sensitivity for nephelometric observers of two or more scattered-light pathlengths when measuring along a single ray path of a beam of light propagating through a suspension medium in the assay of a sample of unknown turbidity value and unknown particle-size distribution is needed.

In addition to the introduction of error due to a particle size dependence at non-nephelometric scatter angles, correlation errors also exist in devices of prior art as of example U.S. Pat. No. 5,506,679 Cooper et al., as the result of adjoined responses non-nephelometric detectors. An abrupt change in the response of adjoined non-nephelometric detectors exists due to a weak detector response at low turbidity values in a back-scatter angular position and a strong response in a forward-scatter and transmittance detector position. This is inversely true at high turbidity values vs. observation angle. This is particularly noticeable at the transition point of adjoined of non-nephelometric detector responses whereof the sensitivity is significantly different for detectors positioned at non-nephelometric angles to the incident beam ray path. A transition point of adjoined responses further described as the point at which the first scattered-light detector measuring at a first non-nephelometric angle stops contributing to determination of a turbidity value and a second detector of a second non-nephelometric angle begins contributing to the assay. Slight variation in the operating conditions of the assay as compared to the calibration conditions results in a noticeable discontinuity in the reported turbidity value near the transition point of adjoined detector responses.

Considered still another problem in devices of prior art, are the number of calibrators needed to define the turbidity value vs. observer response over an extended turbidity range; an extended range further described as a turbidity range near or beyond the maximum response of any one scattered-light detector of a given observation angle. Devices of prior art typically require four or more calibrators in the determination of a turbidity value over an extended turbidity range. Decreasing the number of calibrators used in performing of a calibration reduces the risk of procedural error, time, labor, and the lifetime cost of ownership of the device.

As previously described, devices of prior art including detectors of non-nephelometric observation angles accomplish an extended assay of turbidity beyond the maximum response of any one detector through the combination or adjoining of detector responses that are sensitive to the particle-size distribution of the sample.

A device that can utilize a novel polynomial expression to describe the response of a nephelometric detector to the amount of light scattered from a beam propagating through a suspension medium regardless of the pathlength or particle-size distribution of the sample is needed. The novel polynomial expression may require three or less calibrators in a determination of a turbidity value in the range of 0 and 4000 NTU resulting in a reduction in the cost of ownership and improvement in the quality of the calibration process.

DETAILED DESCRIPTION

Figure 1A:
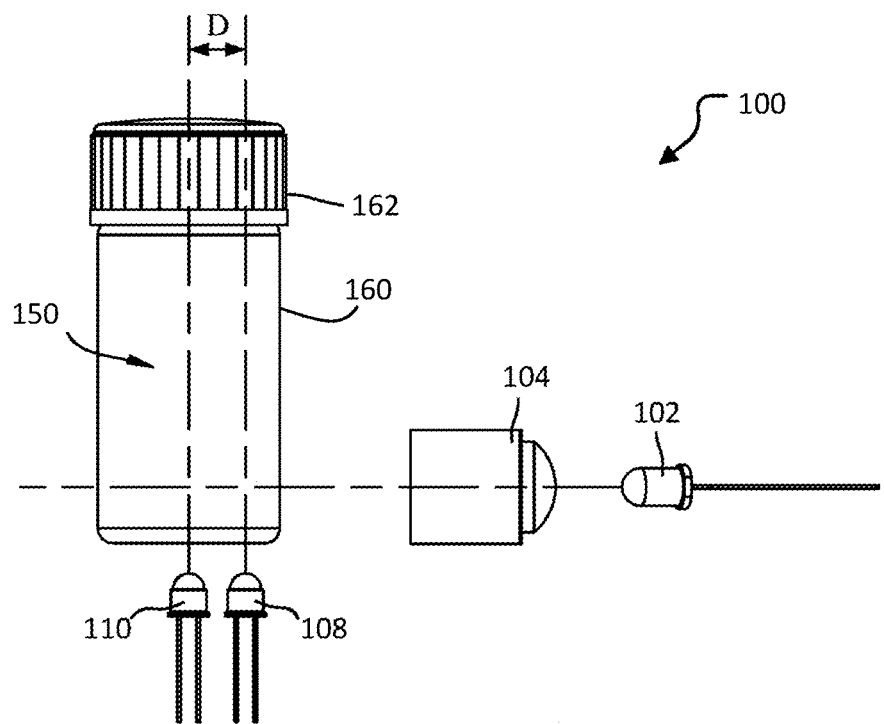
FIG. 1A is a side view of a nephelometric measuring device according to one embodiment of the present disclosure.

Embodiments of the present disclosure include nephelometric measuring devices that implement scattered-light detectors to measure a scattered-light value and correlate a change in the scattered-light value to a change in concentration of particles in a suspension. More specifically, embodiments are contemplated that include nephelometric measuring devices that implement scattered-light detectors to measure scattered light of a sample and calculate a scattered-light value of the sample. A change in a concentration of particles within the sample may result in a change in the scattered-light value and may be correlated to a standard suspension unit where a relationship between particle concentration and scattered-light value is known. Typically, the nephelometric measuring devices can receive scattered light from a beam of light propagating through a suspension (e.g., water). The nephelometric measuring devices can detect light from two or more scattered-light paths having varying lengths where a sensitivity of the detector(s) is substantially equal in sensitivity to a change in the concentration of particles in the suspension medium. Each scattered-light pathlength can cause a maximum response at a corresponding turbidity value. The nephelometric measuring devices can be substantially insensitive to a change in the particle-size distribution of the sample. A response of the nephelometric measuring devices to a change in a turbidity value of the suspension can be described in high correlation to single polynomial equations regardless of the pathlength.

Nephelometric measuring devices can be implemented to measure a scattered-light value. For instance, a nephelometric measuring device can measure scattered light from particles in a suspension and correlate the scattered-light value to a light scattering suspension standard such as formazine (e.g., NTU). If the albedo (i.e., whiteness) of particles in the sample is low relative to the standard to which the device was calibrated, then the reported particle concentration value would be reported lower than expected, or in error. An amount of light scattered from an unknown sample of particles in suspension can produce a relative response equivalent to a calibration suspension (e.g., a turbidity value in NTU).

Embodiments of the nephelometric measuring devices can allow for an assay of both low and high turbidity samples to be accomplished without the introduction of error due to a change in particle-size distribution of the sample from that of a calibration or reference standard. Further, the nephelometric measuring devices can allow for error reductions from an elimination of non-nephelometric scattered-light observers and a decrease in a number of calibrators needed to describe the response of a nephelometric detector regardless of the number of pathlengths included in an assay.

Of significant note, a change in response of two or more light detectors receiving scattered light at a nephelometric angle of 85-110° from a beam of light propagating through a suspension from two or more scattered-light pathlengths to a change in the concentration of particles in the suspension medium can be substantially equivalent. For instance, a sensitivity of a light detector receiving scattered light of two or more wavelengths at a nephelometric angle of 85-110° from a beam of light propagating through the suspension can be substantially equivalent to an incremental change in a concentration of particles in the suspension.

The response of a light detector receiving scattered light at a nephelometric angle of 85-110° from a beam of light propagating through a suspension medium can be in accordance to an equation selected from a group of non-linear equations where: $x/y = a_n x^n + a_{n-1} x^{n-1} + \ldots + a_2 x^2 + a_1 x + a_0$. Where "n" is an integer greater than 0, "x" is equal to the turbidity value of the suspension, "y" is equal to the response of the scattered-light detector, and "an" are calibration coefficients.

The calibration coefficients "an" of a light detector receiving scattered light at a nephelometric angle of 85-110° from a beam of light propagating through a suspension can be in accordance to an equation selected from a group of non-linear polynomial equations of the same order where $x/y=a_n x^n+a_{n-1}x^{n-1}+ \ldots +a_2 x^2+a_1 x+a_0$, and are determinable from a set of light-scattering calibrators of a quantity greater than or equal to the number terms of the selected equation.

Embodiments of the nephelometric measuring devices can exhibit, but are not limited to, the following traits: (i) a maximum response of one or more light detectors receiving scattered light from two or more scattered-light pathlengths at a nephelometric angle of 85-110° from a beam of light propagating through a suspension can occur at a turbidity value that may be dependent upon the scattered-light pathlength; (ii) the response of one or more light detectors receiving scattered light at a nephelometric angle of 85-110° from a beam of light propagating through a suspension containing particles of one or more wavelength can cause a nephelometric detector response corresponding to one or more scattered-light pathlengths; (iii) a scalar applied to the response of a scattered-light detector receiving scattered light at a nephelometric angle of 85-110° from a beam of light propagating through a suspension of a first scattered-light pathlength can result in an equivalent response of the scattered-light detector at a second scattered-light pathlength at a turbidity value of choice; (iv) and variations in the intensity of the incident beams propagating along a ray path are not causing of a change in the ratio of response of a light detector receiving scattered light at a nephelometric angle of 85-110° from a beam of light propagating through a suspension containing particles of two or more scattered-light pathlengths.

In an embodiment, a nephelometric measuring device can be implemented to measure a scattered-light value of a suspension. The nephelometric measuring device can include, but is not limited to, an electromagnetic radiation source, a beam sampler, a first electromagnetic radiation detector, a second electromagnetic radiation detector, and a third electromagnetic radiation detector. The second electromagnetic radiation detector can be (i) adapted to receive scattered electromagnetic radiation, and (ii) oriented approximately at an angle of 85-110° to a ray path of an output of the electromagnetic radiation source. The third electromagnetic radiation detector can be (i) adapted to receive scattered electromagnetic radiation, and (ii) oriented approximately at an angle of 85-110° to the ray path of the output of the electromagnetic radiation source. A change in the scattered-light value determined by the nephelometric measuring device based on the second electromagnetic radiation detector and the third electromagnetic radiation detector receiving scattered electromagnetic radiation can be substantially equivalent to change in a concentration of particles in the suspension at low turbidity values.

In an embodiment, a nephelometric measuring device can be implemented to measure a scattered-light value of a suspension. The nephelometric measuring device can include, but is not limited to, an electromagnetic radiation source, a beam sampler, a first electromagnetic radiation detector located proximate the beam sampler, a second electromagnetic radiation detector, and a third electromagnetic radiation detector. The second electromagnetic radiation detector can be (i) adapted to receive scattered electromagnetic radiation, (ii) located proximate a bottom of the container, and (iii) oriented approximately at an angle of 85-110° to a ray path of an output of the electromagnetic radiation source. The third electromagnetic radiation detector can be (i) adapted to receive scattered electromagnetic radiation, (ii) located proximate the bottom of the container, and (iii) oriented approximately at an angle of 85-110° to the ray path of the output of the electromagnetic radiation source. A change in the scattered-light value determined by the nephelometric measuring device based on the second electromagnetic radiation detector and the third electromagnetic radiation detector receiving scattered electromagnetic radiation can be substantially equivalent to change in a concentration of particles in the suspension at low turbidity values.

In an embodiment, a nephelometric measuring device can be implemented to measure a scattered-light value of a suspension. The nephelometric measuring device can include, but is not limited to, an electromagnetic radiation source, a beam sampler, a first electromagnetic radiation detector located proximate the beam sampler, a second electromagnetic radiation detector, and a third electromagnetic radiation detector. The second electromagnetic radiation detector can be (i) adapted to receive scattered electromagnetic radiation waves, (ii) located proximate a bottom of the container, and (iii) oriented approximately at an angle of 85-110° to a ray path of an output of the electromagnetic radiation source. The third electromagnetic radiation detector can be (i) adapted to receive scattered electromagnetic radiation waves, (ii) located proximate a side of the container, and (iii) oriented (a) approximately at an angle of 85-110° to the ray path of the output of the electromagnetic radiation source, and (b) substantially perpendicular to the second electromagnetic radiation detector. A change in the scattered-light value determined by the nephelometric measuring device based on the second electromagnetic radiation detector and the third electromagnetic radiation detector receiving scattered electromagnetic radiation can be substantially equivalent to change in a concentration of particles in the suspension at low turbidity values.

In an embodiment, a nephelometric measuring device can be implemented to measure a scattered-light value of a suspension. The nephelometric measuring device can include, but is not limited to, a first electromagnetic radiation source emitting electromagnetic radiation in a first wavelength, a second electromagnetic radiation source emitting electromagnetic radiation in a second wavelength, and an electromagnetic radiation detector adapted to receive scattered light at a nephelometric angle of 85-110° to a ray path of an output of the first and second electromagnetic radiation sources. A change in the scattered-light value determined by the nephelometric measuring device based on the electromagnetic radiation detector receiving electromagnetic radiation on the first wavelength and the second wavelength can be substantially equivalent to a change in a concentration of particles in the suspension.

In an embodiment, a nephelometric measuring device can be implemented to measure a scattered-light value of a suspension. The nephelometric measuring device can include, but is not limited to, a vial, a light emitter, a beam sampler, a first light detector, a second light detector, a lens, a field stop, a light trapping surface, and a dark reference surface. The vial can be implemented for containment of a suspension. The light emitter can be adapted to project a beam of light at predetermined wavelengths through the suspension along a first ray path. The beam sampler can be adapted to redirect a portion of the beam of light to a reference light detector. The first light detector can be adapted to receive scattered light having a first scattered-light pathlength and positioned at a nephelometric angle of 85-110° to the first ray path of the beam of light propagating through the suspension. The second light detector can be adapted to receive scattered light having a second scattered-light pathlength and positioned at a nephelometric angle of 85-110° to the first ray path of the beam of light propagating through the suspension. The lens can be positioned between the second light detector and the vial to form an image of the second light detector within the suspension. The field stop can be positioned between the lens and the second light detector. The field stop can include an aperture that can limit a field angle of the image of the second light detector to exclude light scatter from an incident beam of light as the incident beam of light propagates through interfaces. The light trapping surface can be adapted to attenuate an energy of the beam of light not scattered by the suspension. A change in the scattered-light value determined by the nephelometric measuring device based on the first light detector receiving scattered-light on the first scattered-light pathlength and second light detector receiving scattered-light on the second scattered-light pathlength can be substantially equivalent to change in a concentration of particles in the suspension.

In an embodiment, a nephelometric measuring device can be implemented to measure a scattered-light value of a suspension. The nephelometric measuring device can include, but is not limited to, a vial, a light emitter, a beam sampler, a first light detector, and a second light detector. The vial can be adapted to contain a suspension. The light emitter can be adapted to project a beam of light at predetermined wavelengths through the suspension along a first ray path. The beam sampler can be adapted to direct a portion of the beam of light to a reference detector. The first light detector can receive scattered light having a first scatter-light pathlength and can be positioned at a nephelometric angle of 85-110° to the first ray path of the beam of light propagating through the suspension. The second light detector can receive scattered light having a second scattered-light pathlength and can be positioned at a nephelometric angle of 85-110° to the first ray path of the beam of light propagating through the suspension. A change in the scattered-light value determined by the nephelometric measuring device based on the first light detector receiving scattered-light on the first scattered-light pathlength and second light detector receiving scattered light on the second scattered-light pathlength can be substantially equivalent to change in a concentration of particles in the suspension.

In an embodiment, a nephelometric measuring device can be implemented to measure a scattered-light value of a suspension. The nephelometric measuring device can include, but is not limited to, a vial, a first light emitter, a second light emitter, a beam sampler, a light detector, a lens, a field stop, a light trapping surface, and a dark reference surface. The vial can be implemented for containment of a suspension. The first light emitter can be adapted to project a first beam of light at a first wavelength through the suspension along a first ray path. The second light emitter can be adapted to project a second beam of light at a second wavelength through the suspension along the first ray path. The beam sampler can be adapted to redirect a portion of the first beam of light and the second beam of light to a reference light detector. The light detector can be (i) adapted to receive scattered light from the first beam of light and the second beam of light, and (ii) positioned at a nephelometric angle of 85-110° to the first ray path. The lens can be positioned between the light detector and the vial to form an image of the light detector within the suspension. The field stop can be positioned between the lens and the light detector. The field stop can include an aperture that limits a field angle of the image of the light detector to exclude light scatter from an incident beam of light. The light trapping surface can be adapted to attenuate an energy of the first beam of light and the second beam of light not scattered by the suspension. A change in the scattered-light value determined by the nephelometric measuring device based on the light detector receiving scattered light from the first beam of light and scattered light from the second beam of light can be substantially equivalent to a change in a concentration of particles in the suspension.

In an embodiment, a nephelometric measuring device can be implemented to measure a scattered-light value of a suspension. The nephelometric measuring device can include, but is not limited to, a vial, a broadband light emitter, a scattered-light detector, a lens, a field stop, a first bandpass filter, and a second bandpass filter. The vial can be implemented for containment of a suspension. The broadband light emitter can be adapted to project a beam of light through the suspension along a first ray path. The scattered-light detector can be adapted to receive scattered light and can be positioned at a nephelometric angle of 85-110° to the first ray path of the beam of light propagating through the suspension. The lens can be positioned between the scattered-light detector and the vial to form an image of the scattered-light detector within the suspension. The field stop can be positioned between the lens and the scattered-light detector. The first bandpass filter and the second bandpass filter can each be positioned between the field stop and the scattered-light detector. The first bandpass filter can be adapted to pass scattered light of a first wavelength. The second bandpass filter can be adapted to pass scattered light of a second wavelength; A change in the scattered-light value determined by the nephelometric measuring device based on the scattered-light detector receiving scattered light of two or more wavelengths from the beam of light propagating through the suspension can be substantially equivalent to an incremental change in a concentration of particles in the suspension at low concentrations of particles.

The present disclosure can be embodied as devices, systems, methods, and/or computer program products. Accordingly, the present disclosure can be embodied in hardware and/or in software (including firmware, resident software, micro-code, etc.). Furthermore, the present disclosure can take the form of a computer program product on a computer-usable or computer-readable storage medium having computer-usable or computer-readable program code embodied in the medium for use by or in connection with an instruction execution system. In one embodiment, the present disclosure can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner by which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The terms "photodetector," "photosensor," "nephelometric detector," "nephelometric observer," "observer," "light detector," "scattered-light detector," and "electromagnetic radiation detector," as used in the specification and appended claims, can be used interchangeably and refer to devices configured to detect light or other electromagnetic radiation.

The terms "turbidity," "haze," "cloudiness," and "scattered-light value," as used in the specification and appended claims, refers to the light-scattering characteristic of a sample or standard suspension due to suspended particles within a medium.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

A First Embodiment of a Nephelometric Measuring Device

Referring to FIGS. 1A-1D, detailed diagrams of a first embodiment 100 of a nephelometric measuring device are illustrated. The first embodiment nephelometric measuring device 100 can be implemented to measure a concentration of suspended particles in a medium.

As shown generally in FIGS. 1A-1D, the nephelometric measuring device 100 can include, but is not limited to, an electromagnetic radiation source 102, a beam sampler 104, a first photodetector (or light detector) 106, a second photodetector (or light detector) 108, and a third photodetector (or light detector) 110. The nephelometric measuring device 100 can be implemented to measure a concentration of suspended particles in a sample 150 stored in a vial 160 having a cap 162. The first light detector 106 can be implemented as a reference light detector. Each of the light detectors 106, 108, 110 can be configured to detect electromagnetic radiation generated by the electromagnetic radiation source 102.

The electromagnetic radiation source 102 may be a light emitting diode (or light emitter). An incident beam of the nephelometric measuring device 100 can be comprised of a collimation of rays of electromagnetic radiation emanating from the light emitter 102 constrained to a divergence of 2.5° or less. A wavelength of the incident beam can often be determined by a regulatory requirement or standard practice for a given application. For determination of particular matter in drinking water, various United States Environmental Protection Agency (USEPA) methods preferentially require the incident beam be comprised of wavelengths within the visible spectrum of 400-700 nm, while compliance to ISO method 7027 requires the incident beam be comprised of near infrared wavelengths between 830-890 nm. Other regulatory requirements also dictate the collection angle subtended by the scattered-light detector and the measurement angle to the ray path of the interrogation beam. For regulatory compliance of potable water, a nephelometric angle is typically specified centered at 90° to the ray path of the incident beam. Of other regulatory and non-regulatory applications, a nephelometric angle of 85-110° is pertinent for an assay of scattered light and share a property of indifference to the particles of different sizes in the suspension medium.

Figure 1B:
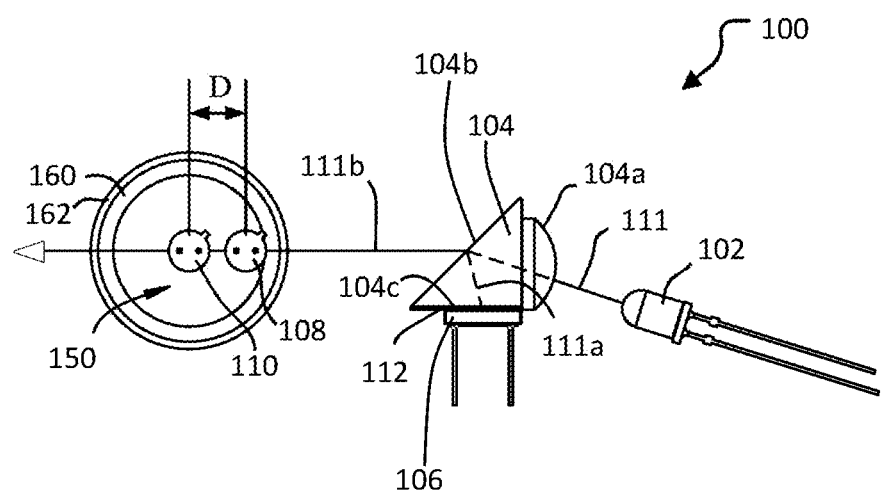
FIG. 1B is of a bottom view of a nephelometric measuring device according to one embodiment of the present disclosure.

As shown in FIG. 1B, light comprised of wavelengths of interest (e.g., predetermined wavelengths) can be radiated from the light emitter 102 and propagate along a first ray path 111. Radiated light from the light emitter 102 can be collimated by refraction at a convex optical surface 104a of the beam sampler 104. The convex optical surface 104a may be comprised of optical material (e.g., Schott NBK7) that may transmit at least a portion of the wavelengths of interest. Light propagating through the beam sampler 104 can partially be reflected at a hypotenuse 104b of the beam sampler 104, whereupon a portion of the light can be redirected internally along a redirected ray path 111a to fall incident upon the reference light detector 106. In one instance, the reference light detector 106 can be bonded to an opposite face 104c of the beam sampler 104 by means of an optical adhesive 112. The amount of light falling incident upon the reference light detector 106 can be in proportion to the power of the collimated beam.

A change in the amount light radiated from the light emitter 102 due to environmental influence or input power variation can be determinable as a change in the electrical signal generated at the reference light detector 106 (e.g., where the reference light detector 106 is a photodiode). A reference signal can be applied in the determination of the turbidity value of the sample 150 by adjusting the scattered light signal in proportion to the change in reference signal. Light not internally reflected at optical surface hypotenuse 104b can be refracted along a first incident ray path 111b and can be directed through the sample 150. A volume of the sample can be limited to the volume within the vial 160 and the cap 162. Cylindrical sides and a bottom of the vial 160 can allow transmission of at least a portion of the wavelengths of interest and permit the observation of scattered light from the incident beam propagating through the sample 150. Typically, the vial 160 can be manufactured from glass. For example, borosilicate glass, commonly used in the assay of turbidigens of a liquid medium, can be implemented.

The second light detector 108 and the third light detector 110 can each be implemented as scattered-light detectors. The scattered-light detectors 108 and 110 can be positioned below the transparent bottom of the vial 150, along the first incident ray path 111b, and spatially separated at a center-to-center distance of "D" at a nephelometric angle of approximately 90° to the first incident ray path 111b.

Figure 1C:
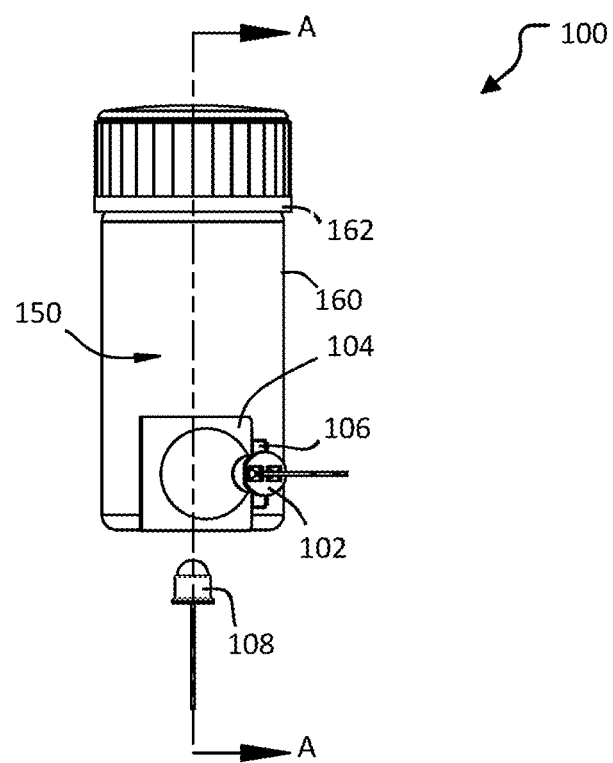
FIG. 1C is a front view of a nephelometric measuring device including a cross-sectional line A-A according to one embodiment of the present disclosure.

Referring to FIG. 1C, a front view of the nephelometric measuring device 100 is illustrated. A cross-sectional line A-A is included in FIG. 1C.

Figure 1D:
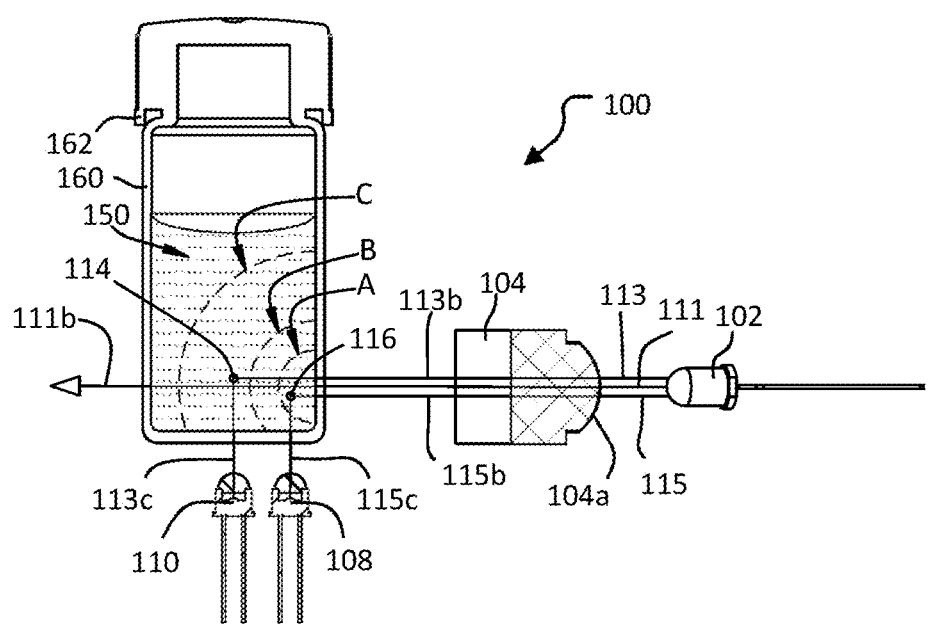
FIG. 1D is a cross-sectional view along line A-A of a nephelometric measuring device according to one embodiment of the present disclosure.

Referring to FIG. 1D, a cross-sectional view along cross-sectional line A-A from FIG. 1C is illustrated. The first ray path 111, a second ray path 113, a third ray path 115, the first incident ray path 111b, a second incident ray path 113b, a third incident ray path 115b, a first scattered ray path 113c, and a second scattered ray path 115c are illustrated. Of note, and similar to the first ray path 111, a portion of the second ray path 113 and the third ray path 115 can be redirected towards the reference light detector 106. When a ray transmitted through the sample 150 along the second incident ray path 113b and the third incident ray path 115b are subject to light scatter upon an encounter with particles 114, 116 in the sample 150, at least a portion of the incident light can be scattered along the first scattered ray path 113c and the second scattered ray path 115c. Scattered light received by the first scattered-light detector 108 along the second scattered ray path 115c, can be of a pathlength shorter than the pathlength of scattered light received by the second scattered-light detector 110 along the first scattered ray path 113c. A scattered-light pathlength can be defined as a total distance that the scattered light travels within the sample 150 to impingent upon one of the scattered-light detectors 108, 110.

Figure 5:
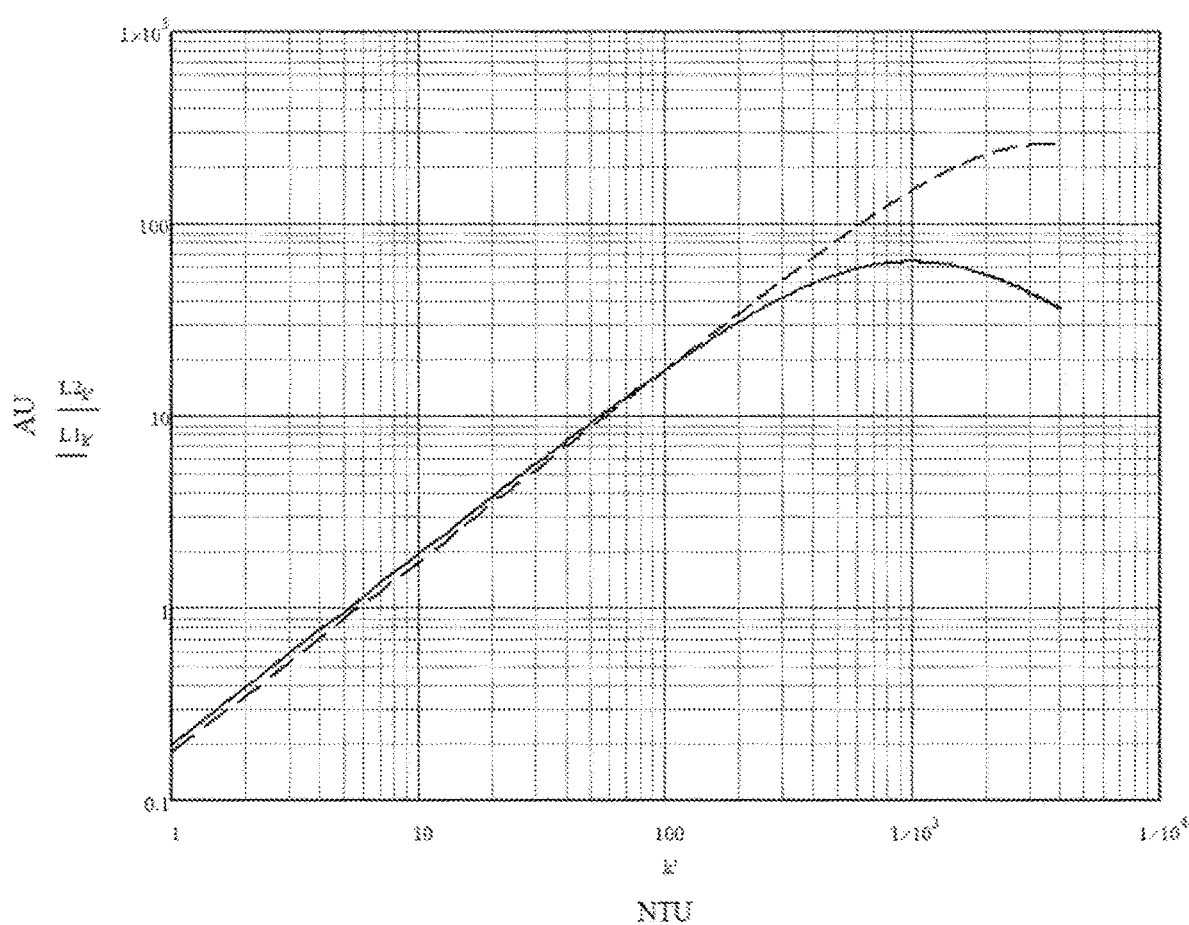
FIG. 5 is a graph of adjusted response curves of two nephelometric detectors from two scattered-light pathlengths.

Also depicted within FIG. 1D are virtual zones (A, B and C) of light scatter gradient. As light propagates through the sample 150, light can be scattered along torturous paths reducing an intensity of the incident beam. Zone A is a zone of shorter scattered pathlengths in comparison to zones B and C. The intensity of an incident beam can decrease as the incident beam propagates from zone A to C due to light scatter. As a concentration of particles within the sample 150 increases, the response of the scattered-light detectors 108, 110 can increase at substantially the same rate. The scattered-light detectors 108, 110 can be characterized as possessing substantially the same sensitivity for low turbidity values as shown in the graph of FIG. 5 for a first scattered pathlength L1 and a second scattered pathlength L2, respectively. As the turbidity of the sample increases further, a maximum turbidity value can be reached for each scattered-light detector 108, 110 where any additional increase of the turbidity of the sample 150 can result in a reduction of the response of the scattered-light detector.

A maximum response of the scattered-light detectors 108, 110 can be unique. The response of a nephelometric detector receiving scattered light along a scattered-light pathlength produces a larger signal value and can reach a maximum response at lower turbidity values as compared to the response of the nephelometric detector of a short scattered-light pathlength. Unobvious in the practice of the invention; regardless of the scattered-light pathlength, the response of a nephelometric scattered-light detector can be described in strong correlation to the turbidity of the suspension medium to a group of non-linear equations wherein x/y is equal to a polynomial equation, in form of a general expression of equation 3 below. Where "n" is greater than "0", "x" is equal to the turbidity value, "y" is equal to the detector response, and "an" are calibration coefficients. Of principle in the innovation of example embodiments are herein disclosed nephelometric response equations of the $1^{st}$, $2^{nd}$ and $n^{th}$ order, as:

$$x/y = a_1 x + a_0 \quad (1)$$

$$x/y = a_2 x^2 + a_1 x + a_0 \quad (2)$$

$$x/y = a_n x^n + a_{n-1} x^{n-1} + \ldots + a_2 x^2 + a_1 x + a_0 \quad (3)$$

The calibration coefficients "an" of one or more nephelometric detectors receiving scattered light of different scattered-light pathlengths, result in a common characteristic response in accordance to an equation selected from a group of non-linear polynomial equations (3) of the same order, being determinable from a set of calibrators of a quantity greater than or equal to the number terms of the selected equation.

In one implementation, the non-linear $1s^t$ order polynomial equation (1) is useful for characterizing the detector response of a nephelometric assay in a quasi-linear turbidity range of sample and the $2n^d$ order equation (2) or high order equations (3) can be more suitable to in the characterization of a nephelometric detector response to a concentration which exceeds the quasi-linear turbidity range. The quasi-linear turbidity range can further be described as a nephelometric turbidity units (NTU) value less than or equal to 100 NTU for a sample contained within a 24 mm vial and interrogated by a beam of light emanating from a white light emitting diode (LED). The order of the equation used in describing the response curve directly relates to the minimum number of calibration points or calibrators needed to define the coefficients of the response function. For a $2^d$ order expression, a minimum of 3 calibration points is required to define the coefficients of the expression. The maximum (or peak) response of equation (2) occurs at:

$$y_{max} = \sqrt{a_o}\sqrt{a_2} \quad (4)$$

where "$a_o$" and "$a_2$" are coefficients of equation (2).

The intersection of the response curves of the scattered-light detectors 108, 110 can be useful as criteria in reporting of a turbidity value of the sample 150. A reported turbidity value greater than or equal to the intersection of the response curves of the scattered-light detectors 108, 110 can be determined from the response of the first scattered-light detector (e.g., the short path length detector) 108 in lieu of the response of the second scattered-light detector (e.g., the long path length detector) 110. A sensitivity of the scattered-light detectors 108, 110 receiving scattered light at a nephelometric angle of 85-110° from a beam of light propagating through the suspension medium can be substantially equivalent to an incremental change in the concentration of particles in the suspension medium at low turbidity values. Adjusting the intersection of the response curves can therefore be useful in the control of the difference in gain between the first scattered-light detector 108 and the second scattered-light detector 110, or for the selection of the scattered-light pathlength to be utilized in reporting of the turbidity value of the sample 150. The intersection of the response of one or more nephelometric detectors of different pathlengths to the amount of scattered light can be adjustable to a turbidity value of choice as the product of a scaling (or gain factor) applied to one response curve with respect to the other. The scaling factor can be determinable by the ratio of the two response curves evaluated at the turbidity value of choice at a value of less than the lowest peak turbidity value of the two or more scattered pathlengths.

Embodiments of the nephelometric measuring device 100 include a common mode of operation of two or more nephelometric observers (e.g., light detectors) receiving scattered light of turbaries different scattered-light pathlengths from a beam propagating through the sample 150 along a single ray path. An improvement can be realized through the positioning of the scattered-light detectors 108, 110 along the incident ray path 111b of FIG. 1B, wherein each scattered-light detector receiving scattered light experiences a proportional change in the intensity of a beam of light propagating through the vial 160 and the sample 150. A change in the intensity of the beam of light can be a result of a variability of the vial 160 and the sample 150. Variability of the vial 160 can include, but is not limited to, a position of the vial 160 in relation to the ray path of the incident beam and the nephelometric detectors, imperfections in the material of the vial 160 (e.g., stria), bubbles and inclusions within the walls of the vial 160, and surface anomalies such as scratches, fingerprints, dust, and dirt. Variability of the sample 150 can include, but is not limited to, a gravimetric stratification of particles in the suspension medium, the precipitation of particles in the suspension medium of different specific gravity at different rates, and/or interference due to bubbles introduced into the sample due to mixing. A change in the intensity of the incident beam can be in common influence to one or more nephelometric detectors receiving scattered light from turbidigens in a sample of two or more scattered-light pathlengths can produce a determination of the turbidity value in close agreement regardless of the pathlength due to commonality of the incident beam variant. In contrast, assays performed along two or more incident beams of distinct ray paths from one or more distinct emitters are more prone to a discrepancy between the two reported turbidity values due to a difference in the intensity of the incident beams along two different ray paths.

A Second Embodiment of a Nephelometric Measuring Device

To achieve a low quantization limit in the assay of a concentration of particles in a suspension medium, a nephelometric observer must be able to distinguish a response to an incremental change in the concentration from an unrelated response. A response of a scattered-light detector unrelated to a light response is noise. Light impingent upon the scattered-light detector causing a response unrelated to the light scatter of the sample from the incident beam is stray light. Contributors to a stray-light response include, but are not limited to, a field of view of the scattered-light detector that exceeds the observation extent of the incident beam within the sample and the presence of external or ambient light within the field of view of the scattered-light detector.

Figure 2A:
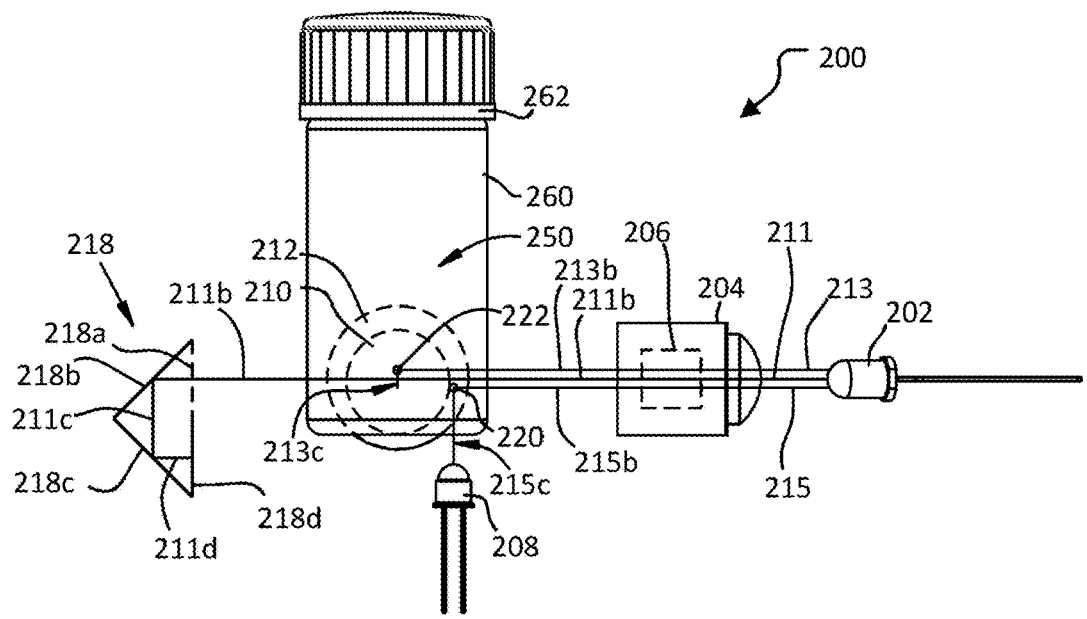
FIG. 2A is a side view of a nephelometric measuring device according to one embodiment of the present disclosure.
Figure 2B:
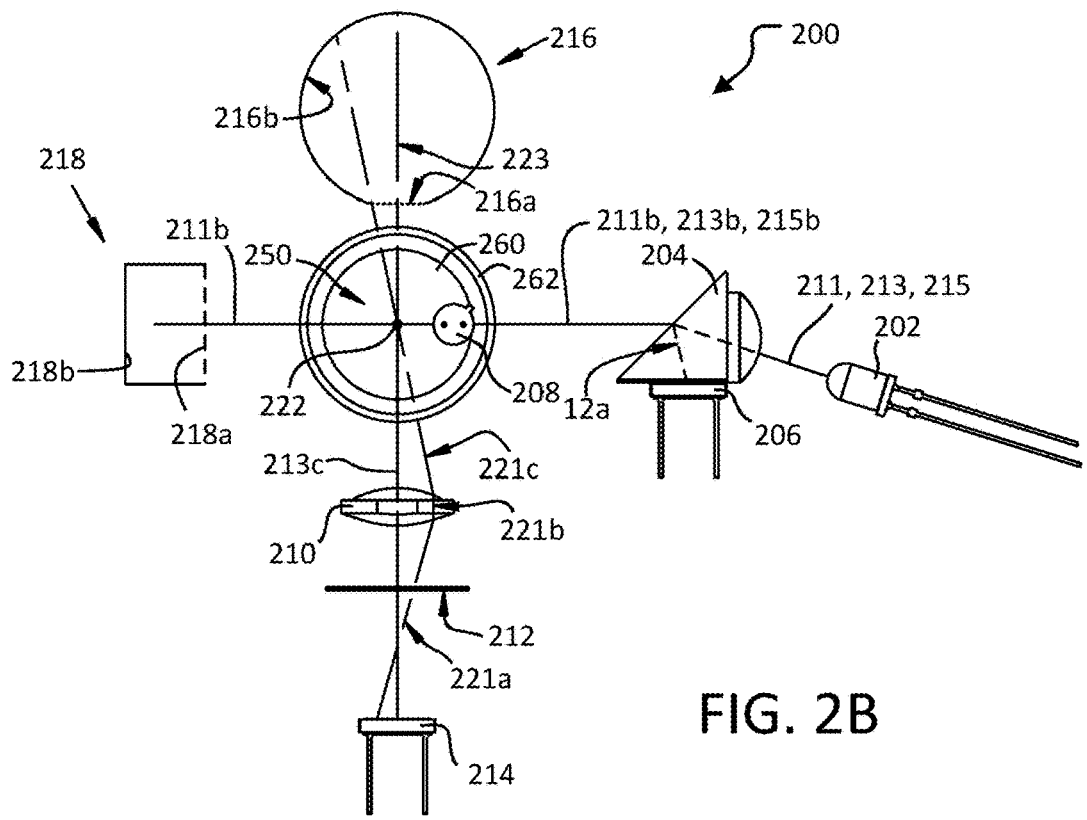
FIG. 2B is of a bottom view of a nephelometric measuring device according to one embodiment of the present disclosure.

Referring to FIGS. 2A-2B, detailed diagrams of a second embodiment 200 of a nephelometric measuring device are illustrated. The second embodiment nephelometric measuring device 200 can be implemented to mitigate stray light to achieve a low quantization limit. Referring to FIG. 2A, a side view of the nephelometric measuring device 200 is illustrated. Referring to FIG. 2B, a bottom view of the nephelometric measuring device 200 is illustrated.

As generally shown, the nephelometric measuring device 200 can include, but is not limited to, an electromagnetic radiation source 202, a beam sampler 204, a first photodetector (or light detector) 206, a second photodetector (or light detector) 208, a lens 210, a field stop 212, a third photodetector (or light detector) 214, a sphere 216, and a light trap 218. The nephelometric measuring device 200 can be implemented to measure a concentration of suspended particles in a sample 250 stored in a vial 260 having a cap 262 and mitigate stray light.

The first light detector 206 can be implemented as a reference light detector. The second light detector 208 and the third light detector 214 can each be implemented as a scattered-light detector. The light trap 218 can be implemented as an incident beam light trap. The sphere 216 can be implemented as a dark reference surface.

The first ray path 211, a second ray path 213, a third ray path 215, the first incident ray path 211b, a second incident ray path 213b, a third incident ray path 215b, a first scattered ray path 215c, and a second scattered ray path 213c are illustrated. Of note, and in similarity to the first ray path 211, a portion of the second ray path 213 and the third ray path 215 can be redirected towards the reference light detector 206. When a ray transmitted through the sample 250 along the second incident ray path 213b and the third incident ray path 215b are subject to light scatter upon an encounter with particles 220, 222 in the sample 250, at least a portion of the incident light can be scattered along the first scattered ray path 215c and the second scattered ray path 213c.

The lens 210, the field stop 212, the second scattered-light detector 214, and the sphere 216 can be aligned (i) along an optical axis 223 at a nephelometric angle of 85-110° to the second incident ray path 213b, and (ii) orthogonal to the first scattered-light detector 208. The lens 210 can project an image of an active area of the second scattered-light detector 214 to the center of the vial 260. A position and a diameter of the lens 210 and the field stop 212, relative to the second scattered-light detector 214 and the vial 260, can limit the field angle of the projected image of the second scattered-light detector 214 to exclude the light scatter at the interfaces whereupon the incident beam propagating through the vial 260 and the sample 250 experiences a change in refractive index and is causing of light scatter of the incident beam. Light scatter from interaction of the incident beam and the sample 250 along the second incident ray path 213$b$ can be impingent upon the second scattered-light detector 214 along a nephelometric ray path 213$c$.

A dark reference surface 216$b$ of the sphere 216 can be absorptive to the wavelengths of interest and can act to attenuate light entering a sphere aperture 216$a$ from stray light or light scattered from the sample 250 by means of multiple internal reflections of residual unabsorbed light impingent upon the dark reference surface 216$b$. The surface composition, structure, and finish of the dark reference surface 216$b$ may be selected from a wide variety of materials and surface features to attenuate light entering the sphere aperture 216$a$. For example, a semi-polished spherical surface constructed of black acrylonitrile butadiene styrene (ABS) plastic can be implemented. An absorptivity of the dark reference surface 216$b$ can be selected to reduce the surface illuminance to less than the required quantization limit as observed by the second scattered-light detector 214 through the lens 210 and the field stop 212. The diameter of the sphere aperture 216$a$ of the sphere 216 can be kept as small as practical, sufficient to encompass an image of the field stop 212, as depicted as marginal rays 221$a$, 221$b$, and 221$c$. In the absence of light scattering particles in the suspension medium of the sample 250, a signal of the second scattered-light detector 214 can be the result of stray light and the surface luminance of the dark reference surface 216$b$. To ensure stray light is sufficiently low, the light trap 218 can absorb light not scattered from the propagation of the incident beam through the vial 260 and the sample 250 along the first incident ray path 211$b$ to prevent the reentry of light to the surfaces bordering the vial 260.

As shown, the light trap 218 can include two or more light absorbing surfaces. Light entering a light trap aperture 218$a$ along the first incident ray path 211$b$ can propagate sequentially to light absorbing surfaces 218$b$, 218$c$, and 218$d$ as depicted in FIG. 2A. Residual light not absorbed at the surface 218$b$ can be directed towards the surface 218$c$ along a first reflected ray path 211$c$. Subsequently, light not absorbed at the surface 218$c$ can be directed towards the surface 218$d$ along a second reflected ray path 211$d$. Residual light not absorbed at the surface 218$d$ can be reflected backwards along reflected ray paths 211$d$, 211$c$ to substantially prevent the reentry of light to the surfaces bordering the vial 260 and prevent stray light from impinging upon the scattered-light detectors 208, 214. The surface composition, structure, and finish of the surfaces of the light trap 218 may be selected from a wide variety of materials and surface features to attenuate light entering the light trap aperture 218$a$. In one example, planar surfaces comprised of semi-polished black ABS plastic can be implemented. The absorptivity of the surfaces of the light trap 218 (i.e., surfaces 218$b$, 218$c$, and 218$d$) can be selected to limit the amount of reflected light to less than 10%. As result, an amount of unabsorbed light reflected backwards along the first incident ray path 211$b$ can be reduced to $-0.10^5$ (or $-\frac{1}{10,000}^{th}$) of the light which had entered the light trap 218. The absorptivity of the light trap surfaces 218$b$, 218$c$ and 218$d$ can affect the attenuation of the light trap 218 in accordance with the product of the reflectance of the surface at the angle of incidence, for each incidence of light impingent upon a light trap surface.

The scattered-light detectors 208, 214 can possess the same characteristics of nephelometric response and sensitivity described in the first embodiment of the scattered-light detectors 108, 110 to a change in the turbidity value of the sample 250. The scattered-light detectors 208, 214 can receive light scattered along the scattered ray paths 213$c$ and 215$c$ from an encounter with particles 220, 222 in suspension, respectively. Regardless of the scattered-light pathlength, the response of the scattered-light detectors 208, 214 from a beam of light propagating through a suspension medium can be described in strong relation to the turbidity of the suspension medium in correlation to a group of non-linear equations wherein x/y is equal to a polynomial equation, in form of the equation (3) previously described above.

Figure 2C:
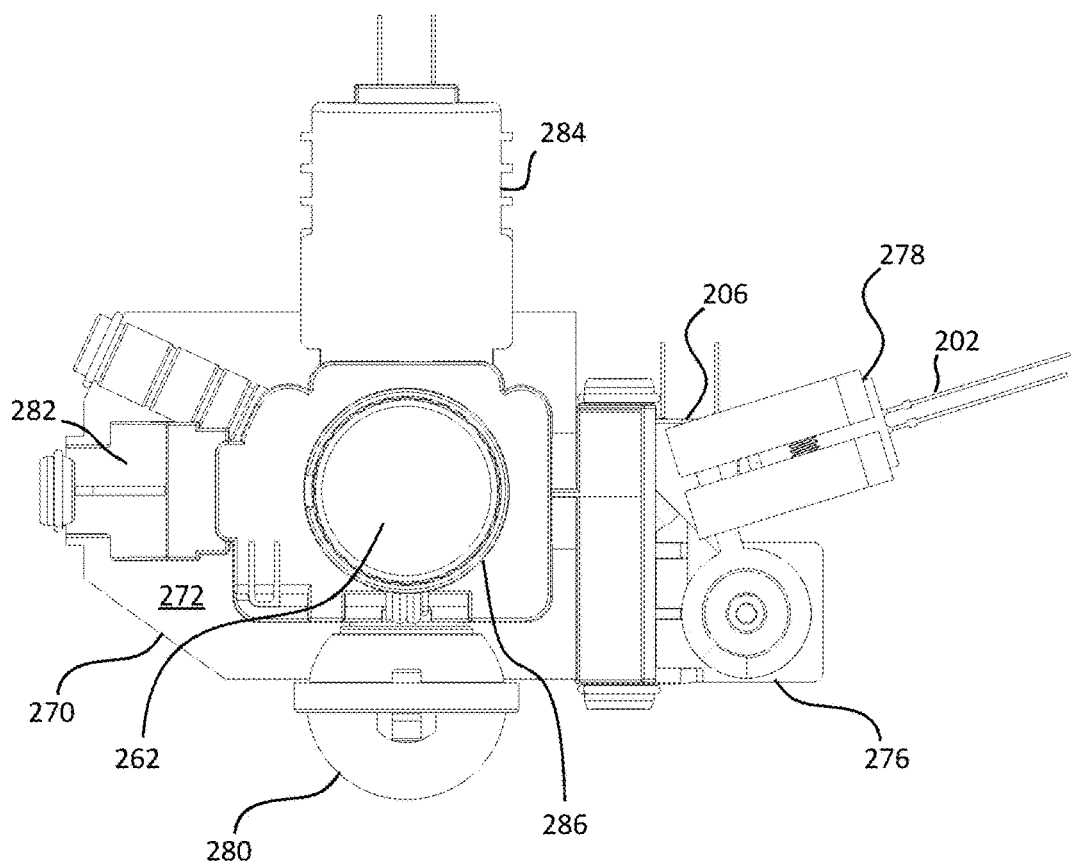
FIG. 2C is a top view of a nephelometric measuring device housing according to one embodiment of the present disclosure.
Figure 2D:
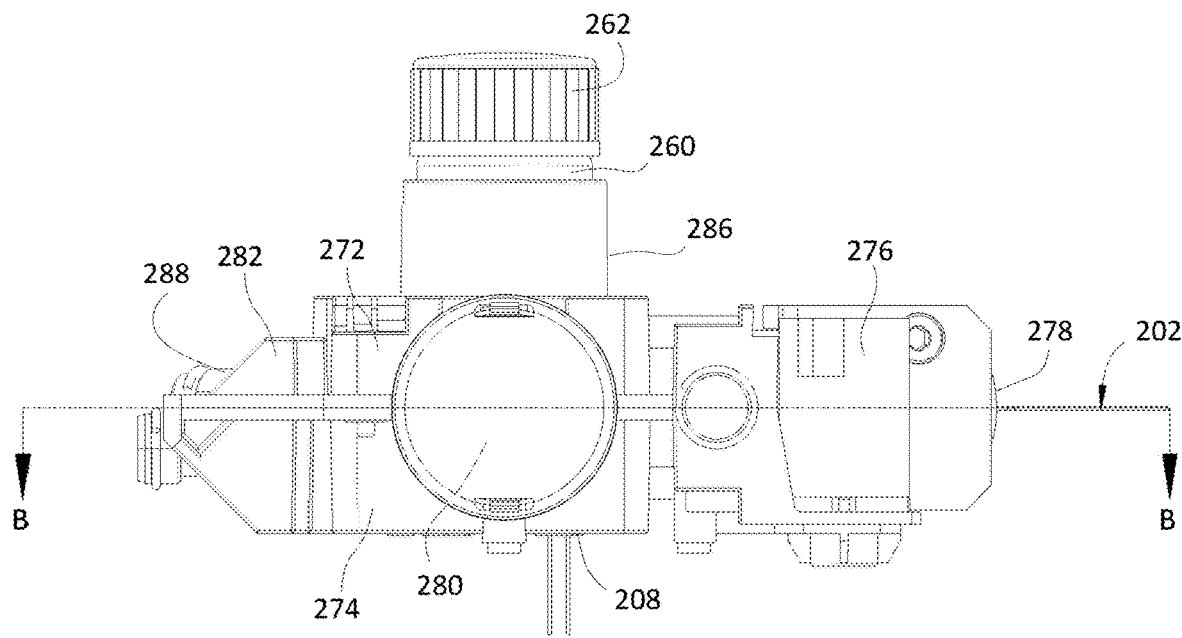
FIG. 2D is a side view of a nephelometric measuring device housing including a cross-sectional line B-B according to one embodiment of the present disclosure.
Figure 2E:
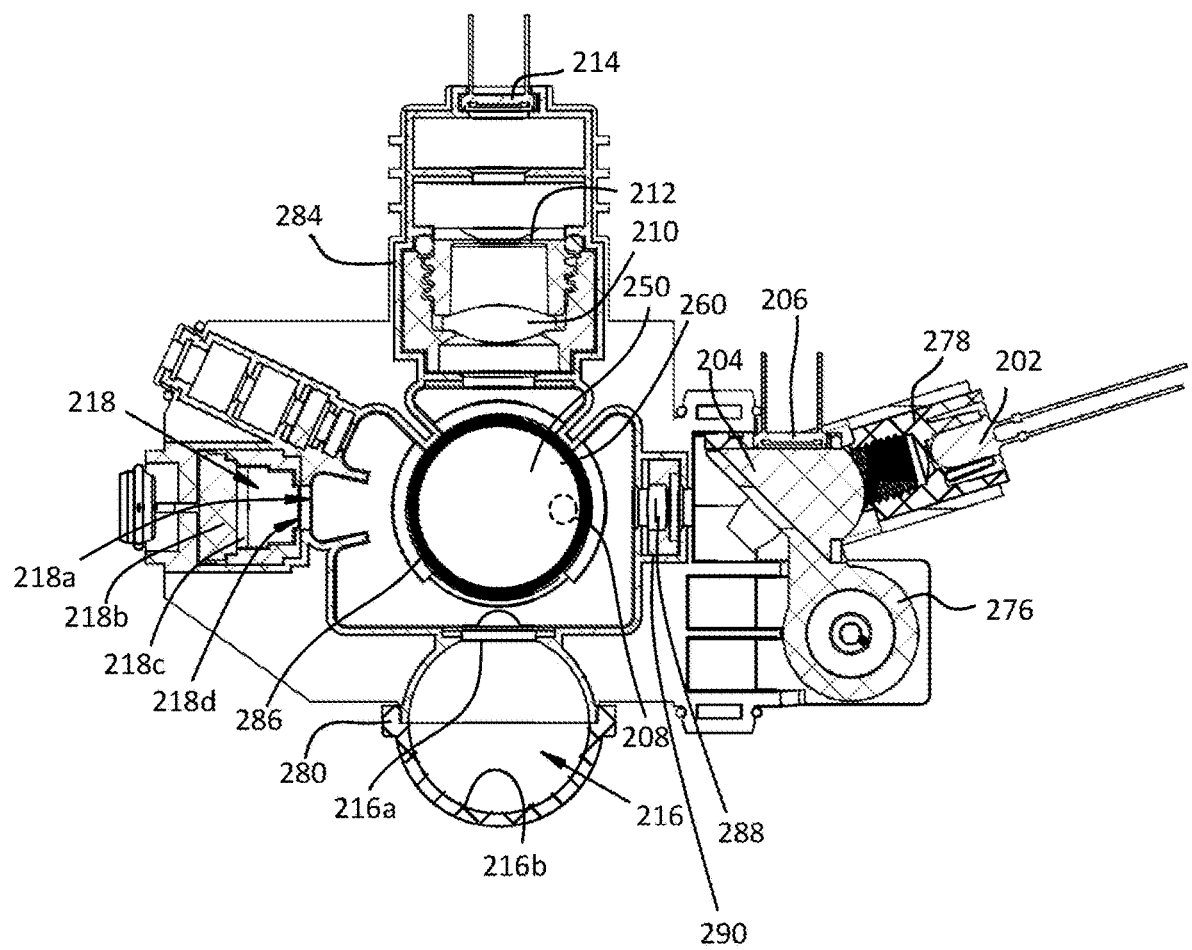
FIG. 2E is a cross-sectional view along line B-B of a nephelometric measuring device housing according to one embodiment of the present disclosure.
Figure 3A:
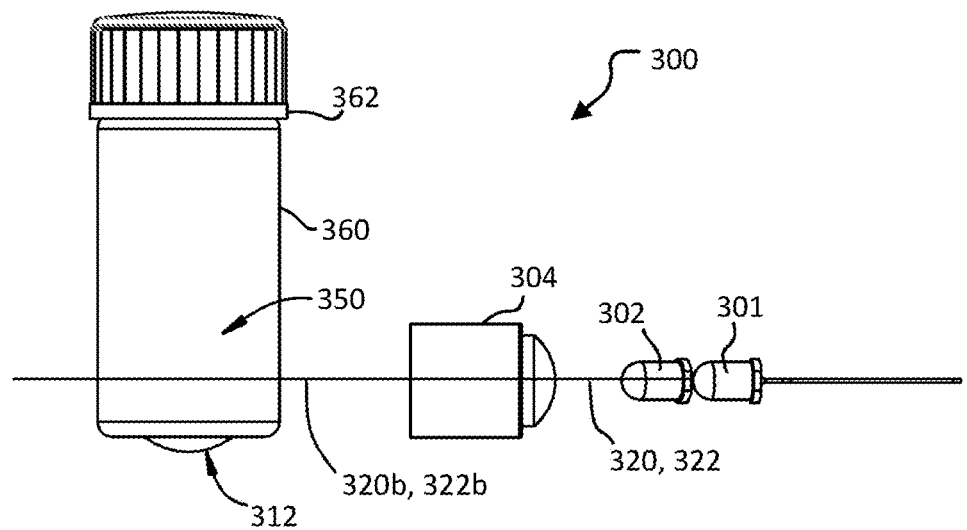
FIG. 3A is a side view of a nephelometric measuring device according to one embodiment of the present disclosure.
Figure 3B:
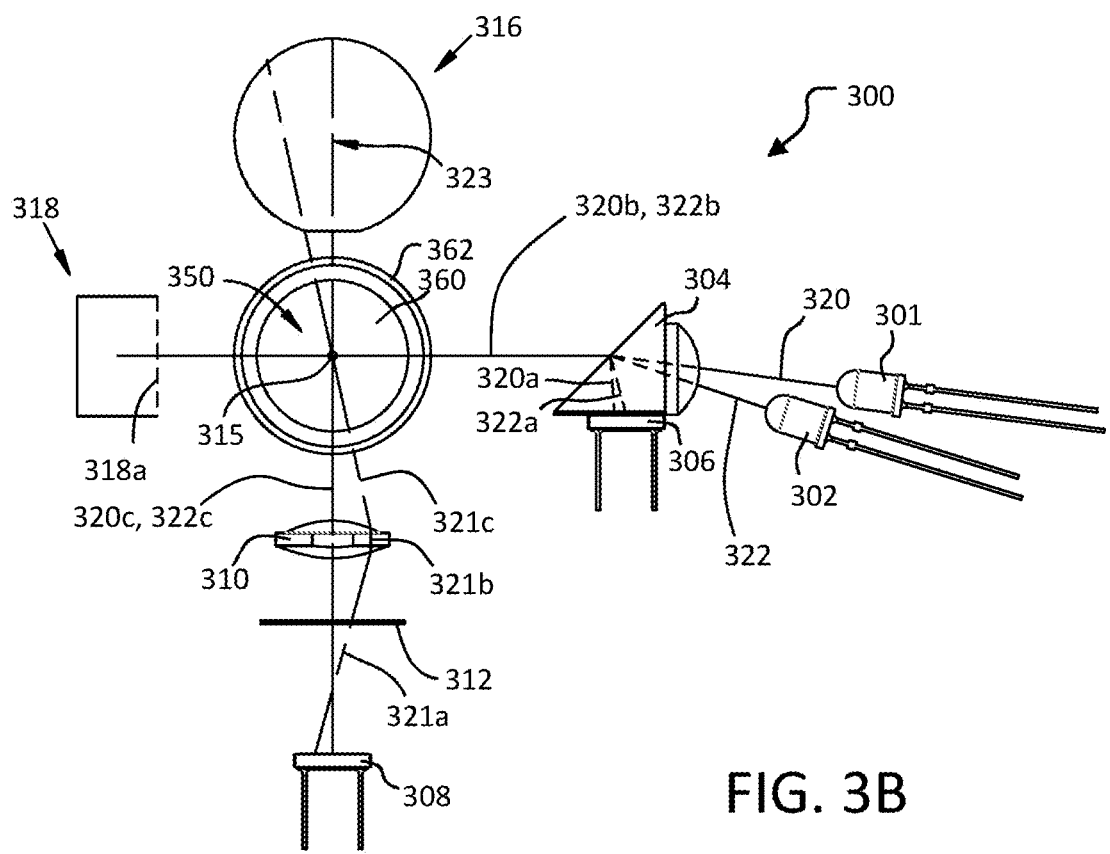
FIG. 3B is of a bottom view of a nephelometric measuring device according to one embodiment of the present disclosure.
Figure 4:
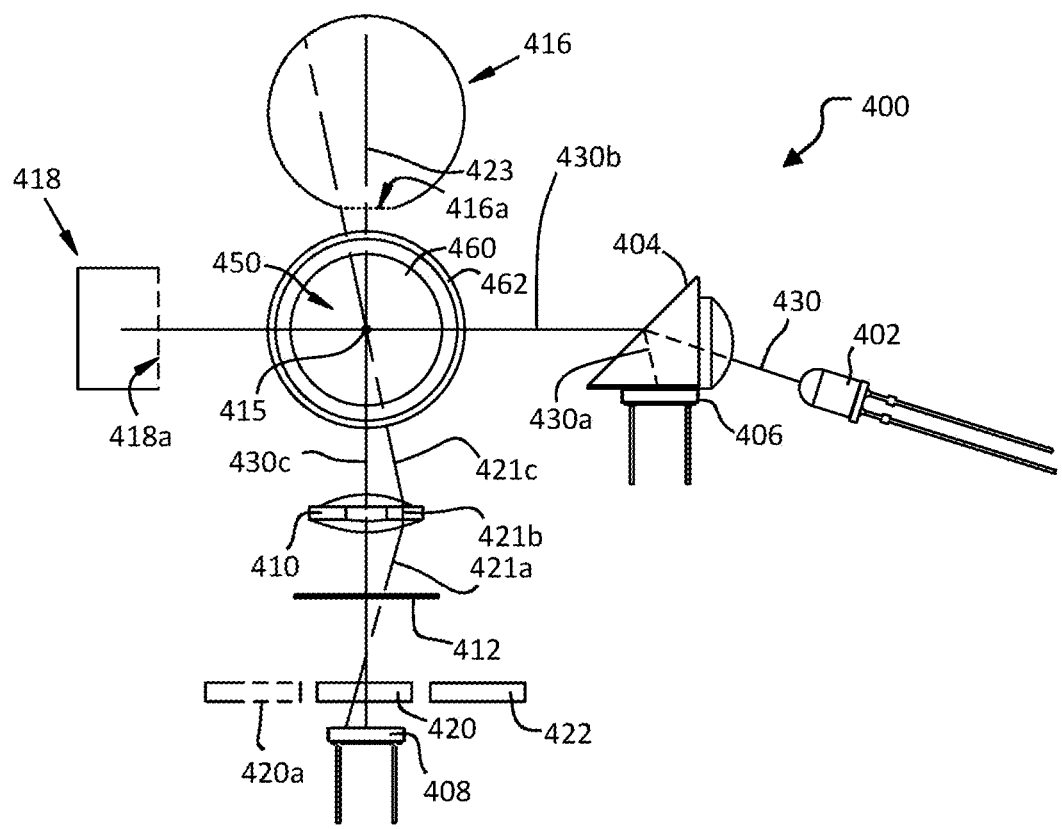
FIG. 4 is a bottom view of a nephelometric measuring device according to one embodiment of the present disclosure.

Referring to FIGS. 2C-2E, the second embodiment nephelometric measuring device 200 is shown in a housing 270. The housing 270 is one example structure for assembling the components of the nephelometric measuring device 200 together and is not meant to be limiting. Of note, variations of the housing 270 can be modified to house each of the described nephelometric measuring devices described herein. Referring to FIG. 2C, a top view of the housing 270 is illustrated. Referring to FIG. 2D, a side view of the housing 270 and the vial 260 is illustrated. FIG. 2D further includes a cross-sectional line B-B. Referring to FIG. 2E, a cross-sectional view of the housing 270 along the cross-sectional line B-B is illustrated.

Referring generally to FIGS. 2C-2E, the housing 270 can include an upper member 272 and a lower member 274 that can be configured to mate together with the components of the nephelometric measuring device 200 housed therein. The housing 270 can further include a beam sampler mount 276, an electromagnetic radiation source mount 278, a hemisphere 280, a light trap mount 282, a scattered-light detector mount 284, a vial receptacle 286, a field lens 288, and a field lens mount 290. Of note, embodiments are contemplated where the field lens 288 and the field lens mount 290 can be removed from the housing. For instance, in instances where the light emitter 202 is a laser diode. In some instances, the field lens mount 290 may be used as an aperture (or baffles) if the field lens 288 is not installed into the field lens mount 290. In one instance, the field lens mount 290 can be eliminated when the field lens 288 is installed directing into the housing 270. The field lens mount 290 can be implemented to center the field lens 288 within the incident beam. The field lens 288 can be implemented to reduce a divergence of the beam such that the extent of the beam falls within the light trap aperture 218$a$.

As shown, the housing 270 can be configured to arrange the components of the nephelometric measuring device 200 as previously described and shown in FIGS. 2A-2B. Of note, a similar housing can be implemented to configure the components of the first embodiment nephelometric measuring device 100 as shown in FIGS. 1A-1D. Further, a similar type housing may be implemented to configure components of embodiments described hereinafter in similarity to the first embodiment and second embodiment nephelometric measuring devices 100, 200.

A Third Embodiment of a Nephelometric Measuring Device

In accordance with the other example embodiments, the sensitivity of a scattered-light detector receiving scattered light of different pathlengths from a beam of light propagating through a suspension medium at a nephelometric angle of 85-110° are substantially the same at low turbidity values and achieve a maximum response different turbidity values of the suspension medium. From light scatter theory, the pathlength of the scattered light from a beam propagating a sample of particles in a suspension medium is dependent upon the wavelength of the incident light and the size of the particles. It is also known that light scattered at 85-110° to the ray path of the incident beam are least dependent upon the size of the particles in the suspension medium.

The response of a nephelometric observer to a change in the wavelength of the scattered light impingent upon the observer is dependent upon the light-scatter properties of the particles in the suspension medium, the absorption of the medium suspension, and the wavelength response to the nephelometric observer. As a primary standard in the assay of particles in an aqueous medium, formazine based turbidigens are not of single particle size but rather of a range between 0.1 to 10 micrometers, which coincides with the particle sizes of interest for pathogens in potable water. The wavelength dependence of formazine is approximately equal to X,' and falls within the realm of Rayleigh and Mie light scatter theory. Otherwise stated, the scattered-light pathlength of a formazine suspension is shorter for an increase in wavelength and longer for a decrease in the wavelength of the scattered light; approximately half that at 660 nm wavelength of light as compared to 470 nm.

Consistent with the principles of the previous embodiments is the amount of scattered light received by a nephelometric observer at angle of 85°-110° from a beam of light propagating through a suspension medium, the response of the observer to the change in the concentration of particles within the suspension medium (i) can be substantially equivalent at low turbidity values for two or more nephelometric observations of different scattered-light pathlengths, (ii) can be in accordance to an equation selected from a group of non-linear equations wherein x/y is equal to a polynomial expression in form of "$a_n x^n + a_{n-1} x^{n-1} + \ldots + a_2 x^2 + a_1 x + a_0$" where "n" is an integer greater than 0, "x" is equal to the turbidity value of the suspension medium, "y" is the response of the nephelometric detector, and "$a_n$" are calibration coefficients, (iii) can reach a maximum response at different turbidity values at different scattered-light pathlengths, and (iv) can be scalable to an equivalent response value for observers of different scattered-light pathlengths.

Referring to FIGS. 2A-2B, detailed diagrams of a third embodiment 300 of a nephelometric measuring device are illustrated. The third embodiment nephelometric measuring device 300 can be configured such that a scattered-light detector receives light scatter of two or more pathlengths from a beam of light comprised of two or more different wavelengths propagating through a suspension medium along a coincident ray path. The light scatter can impinge upon the scattered-light detector of a first wavelength of a first pathlength and a second wavelength of a second pathlength at different time intervals. One or more scattered-light detectors receiving scattered light from two or more scattered-light pathlengths can be achieved from the selection of the scattered-light wavelength impingent upon the scattered-light detector.

As shown, the nephelometric measuring device 300 can include, but is not limited to, a first electromagnetic radiation source 301, a second electromagnetic radiation source 302, a beam sampler 304, a first photodetector (or light detector) 306, a second photodetector (or light detector) 308, a lens 310, a field stop 312, a sphere 316, and a light trap 318. The first and second electromagnetic radiation sources 301, 302 can be implemented as light emitting diodes (or light emitters). The first light detector 306 can be implemented as a reference light detector. The second light detector 308 can be implemented as a scattered-light detector. The lens 310, the field stop 312, the sphere 316, and the light trap 318 can be implemented in similarity to the second embodiment components.

The first light emitter 301 can radiate along a first ray path 320 and the second light emitter 302 can radiate along a second ray path 322. In electrical control, the first light emitter 301 and the second light emitter 302 can be selectable to emit light at different time intervals along the first and second ray paths 320, 322. Light from the first light emitter 301 and the second light emitter 302 can be collimated and partially reflected by the beam sampler 304. The partially reflected beam may fall incident upon the reference light detector 306 along a first reflected ray path 320a and a second reflected ray path 322a. A diameter of a sphere aperture of the sphere 316 can be kept as small as practical, sufficient to encompass an image of the field stop 312, as depicted as marginal rays 321a, 321b, and 321c. To ensure stray light is sufficiently low, the light trap 318 can absorb light not scattered from the propagation of the incident beam through the vial 360 and the sample 350 along the coincident ray paths 320b, 322b to prevent the reentry of light to the surfaces bordering the vial 360.

Light not internally reflected by the beam sampler 304 can propagate along coincident ray paths as result of refraction. For instance, a first incident ray path 320b and a second incident ray path 322b can be coincident. Light from the first light emitter 301 and the second light emitter 302 can be comprised of different wavelengths separated by an isolation band wherein no light is emitted. A portion of the light scattered from a particle 315 along a first scattered ray path 320c and a second scattered ray 322c can be received by the scattered-light detector 308 through the lens 310 and the field stop 312. An image of the scattered-light detector 308 formed by the lens 310 can fall within the sample 350 along an optical axis 323. The image of the field stop 312 (i.e., the extent of the field of view of the scattered-light detector 308 formed by the lens 310) can fall within the sphere 316 through a sphere aperture 316a along the optical axis 323 at a nephelometric angle of 85-110° to the first and second incident ray paths 320b, 322b. Light not scattered by the interaction of the incident beams propagating through the sample 350 can enter the light trap 318 through a light trap aperture 318a and can be attenuated upon light absorbing surfaces therein to prevent the reentry of light to illuminate surfaces bordering the vial 360.

The third example embodiment, comprising of a one nephelometric observer and one incident ray path, further reduces common mode errors by the elimination of the spatially separated scattered-light paths of the first two embodiments. The incident beams propagating along a coincident ray paths 320b, 322b through the vial 360 and the sample 350 can experience substantially the same optical effects unrelated to light scatter from the sample 350 as does the nephelometric observer. The scattered-light detector 308 can discriminate scattered light of different pathlengths as a measure of the amount of scattered light from each beam of different wavelengths propagating through the sample 350 along the coincident ray paths 320b, 322b emitted from the first light emitter 301 and the second light emitter 302 at different time intervals. The sensitivity of a light detector receiving scattered light of two or more wavelengths at a nephelometric angle of 85-110° from a beam of light propagating through the suspension medium can be substantially equivalent to an incremental change in the concentration of particles in the suspension medium at low concentrations of particles.

The selection of the wavelength of light propagating along the coincident ray paths 320*b*, 322*b* may be accomplished in a variety of alternate means within the scope of the invention regardless of the presence of the beam sampler 304 or the reference light detector 306. For example, a wavelength selection means comprised of a broadband light emitter and monochromator, a wavelength tunable cavity, or other wavelength tunable light emitters.

A Fourth Embodiment of a Nephelometric Measuring Device

Referring to FIG. 4, a bottom view of a fourth embodiment 400 of a nephelometric measuring device is illustrated. The fourth embodiment nephelometric measuring device 400 can include components in similarity to the second embodiment and third embodiment nephelometric measuring devices 200, 300.

As shown, the nephelometric measuring device 400 can include, but is not limited to, an electromagnetic radiation source 402, a beam sampler 404, a first photodetector (or light detector) 406, a second photodetector (or light detector) 408, a lens 410, a field stop 412, a sphere 416, and a light trap 418, a first bandpass filter 420, and a second bandpass filter 422. The electromagnetic radiation source 402 may be a broadband light emitter (or broadband light emitting diode). The broadband light emitter 402 can radiate along a first ray path 430. The first light detector 406 can be implemented as a reference light detector. The second light detector 408 can be implemented as a scattered-light detector.

As shown, a beam of light can radiate from the broadband light emitter 402 along a first ray path 430. Radiated light from the light emitter 402 can be collimated by refraction at a convex optical surface of the beam sampler 404. Light propagating through the beam sampler 404 can partially be reflected at a hypotenuse of the beam sampler 404, whereupon a portion of the light can be redirected internally along a redirected ray path 430*a* to fall incident upon the reference light detector 406. Light not internally reflected at the optical surface hypotenuse can be refracted along an incident ray path 430*b* and can be directed through the sample 450.

A diameter of a sphere aperture of the sphere 416 can be kept as small as practical, sufficient to encompass an image of the field stop 412, as depicted as marginal rays 421*a*, 421*b*, and 421*c*. To ensure stray light is sufficiently low, the light trap 418 can absorb light not scattered from the propagation of the incident beam through the vial 460 and the sample 450 along the incident ray path 430*b* to prevent the reentry of light causing irradiance to the surfaces bordering the vial 460.

A portion of the light scattered from a particle 415 along a scattered ray path 430*c* can be received by the scattered-light detector 308 through the lens 410, the field stop 412, and one of the bandpass filters 420, 422. An image of the scattered-light detector 408 formed by the lens 410 can fall within the sample 450 along an optical axis 423. The image of the field stop 412 (i.e., the extent of the field of view of the scattered-light detector 408 formed by the lens 410) can fall within the sphere 416 through a sphere aperture 416*a* along the optical axis 423 at a nephelometric angle of 85110° to the incident ray paths 430*b*.

The scattered-light detector 408 can receive scattered light transmitted through the two or more bandpass filters 420, 422 at approximately 85-110° from an incident beam of broadband light propagating through the sample 450 of two or more scattered-light pathlengths. In one example, the broadband light emitter can be a white light LED emitting light in the visible spectrum between 450-700 nm. Of note, the greater the separation in center wavelengths of the bandpass filters, the greater the difference in the scattered-light pathlengths. Scattered light transmitted through the bandpass filters 420, 422 can impinge upon the scattered-light detector 408 along a scattered ray path 430*c* at different time intervals. Light that is not transmitted through the bandpass filters 420, 422 can be absorbed and/or rejected to prevent scattered light from impinging upon the scattered-light detector 408.

Scattered light impingent upon the scattered-light detector 408 can be a measure of a long scattered-light pathlength through the first bandpass filter 420 and of a short scattered-light pathlength through the second bandpass filter 422 when the first bandpass filter 420 is moved to position 420*a* and the second bandpass filter 422 replaces the position of first bandpass filter 420 in front of the scattered-light detector 408. Exchanging filter positions may be accomplished in a variety of mechanical means. For instance, the filters 420, 422 can be mounted within a rotating wheel and rotated into position. In another instance, the filters 420, 422 can be mounted within a sliding carriage moved linearly into position. In yet another instance, wavelength selection of the scattered light can be accomplished through a monochromator.

It is also readily realized by those skilled in the art that a simultaneous measure of the different wavelengths of broadband scattered light propagating along the scattered ray path 430*c* may be accomplished by alternate means within the scope of the invention, as example but not limited to; through a polychromator or color light sensor comprised of an arrangement of wavelength selective pixels or stacked wavelength selective semiconductor photo-junctions.

The sensitivity of a light detector receiving scattered light of two or more wavelengths at a nephelometric angle of 85-110° from a beam of light propagating through the suspension medium are substantially equivalent to an incremental change in the concentration of particles in the suspension medium at low concentrations of particles.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention. Although embodiments are contemplated with one or two scattered-light detectors, it is to be appreciated that two or more scattered-light detectors can be implemented without exceeding a scope of the present invention.

What is claimed:

1. A nephelometric measuring device for measuring a scattered-light value of a suspension, the nephelometric measuring device comprising:

a vial for containment of a suspension;

a light emitter adapted to project a beam of light at predetermined wavelengths through the suspension along a first ray path;

a beam sampler adapted to redirect a portion of the beam of light to a reference light detector;

a first light detector adapted to receive scattered light having a first scattered-light pathlength and positioned at a nephelometric angle of 85-110° to the first ray path of the beam of light propagating through the suspension;

a second light detector adapted to receive scattered light having a second scattered-light pathlength and positioned at a nephelometric angle of 85-110° to the first ray path of the beam of light propagating through the suspension;

a lens positioned between the second light detector and the vial to form an image of the second light detector within the suspension;

a field stop positioned between the lens and the second light detector and including an aperture that limits a field angle of the image of the second light detector to exclude light scatter from an incident beam of light as the incident beam of light propagates through interfaces;

a light trapping surface adapted to attenuate an energy of the beam of light propagating through the suspension and not scattered by the suspension; and a sphere comprising a sphere aperture configured to allow stray light or light scattered from the suspension to enter the sphere and a dark reference surface configured to attenuate the stray or scattered light;

wherein the lens, the field stop, the second light detector and the sphere are aligned on an optical axis at the nephelometric angle of 85-110° to the first tay path;

wherein a change in the scattered-light value based on the first light detector receiving scattered-light on the first scattered-light pathlength and second light detector receiving scattered-light on the second scattered-light pathlength is substantially equivalent to change in a concentration of particles in the suspension.

2. The nephelometric measuring device of claim 1, wherein the reference detector determines a power of the beam of light.

3. The nephelometric measuring device of claim 1, wherein the vial is transparent to at least a portion of predetermined wavelengths.

4. The nephelometric measuring device of claim 1, wherein a change in a refractive index takes place at the vial and the suspension.

5. The nephelometric measuring device of claim 1, wherein the dark reference surface is in the shape of a sphere and has a surface radiance below a quantization limit of the second light detector upon which the field stop is imaged.

6. The nephelometric measuring device of claim 1, wherein (i) the first light detector is located proximate a bottom of the vial, and (ii) the second light detector is located proximate a side of the vial and oriented substantially perpendicular to the first light detector.

7. A nephelometric measuring device for measuring a scattered-light value of a suspension, the nephelometric measuring device comprising:

a vial for containment of a suspension;

a first light emitter adapted to project a first beam of light at a first wavelength through the suspension along a first ray path;

a second light emitter adapted to project a second beam of light at a second wavelength through the suspension along the first ray path;

a beam sampler adapted to redirect a portion of the first beam of light and the second beam of light to a reference light detector;

a light detector (i) adapted to receive scattered light from the first beam of light and the second beam of light, and (ii) positioned at a nephelometric angle of 85-110° to the first ray path;

a lens positioned between the light detector and the vial to form an image of the light detector within the suspension;

a field stop positioned between the lens and the light detector and including an aperture that limits a field angle of the image of the light detector to exclude light scatter from an incident beam of light;

a light trapping surface adapted to attenuate an energy of the first beam of light and the second beam of light not scattered by the suspension; and a sphere comprising a sphere aperture configured to allow stray light or light scattered from the suspension to enter the sphere and a dark reference surface configured to attenuate the stray or scattered light;

wherein the lens, the field stop, the light detector and the sphere are aligned on an optical axis at the nephelometric angle of 85-110° to the first ray path;

wherein a change in the scattered-light value based on the light detector receiving scattered light from the first beam of light and scattered light from the second beam of light is substantially equivalent to a change in a concentration of particles in the suspension.

\* \* \* \* \*